(12) United States Patent
Abrams

(10) Patent No.: US 6,836,870 B2  
(45) Date of Patent: Dec. 28, 2004

(54) METHOD AND SYSTEM FOR INCORPORATING A DYNAMIC SITUATION DISPLAY IN A POWERPOINT SLIDE SHOW PRESENTATION

(75) Inventor: Stephen Alfred Abrams, San Diego, CA (US)

(73) Assignee: Cubic Corporation, San Diego, CA (US)

(*) Notice: Subject to any disclaimer, the term of this patent is extended or adjusted under 35 U.S.C. 154(b) by 325 days.

(21) Appl. No.: 09/882,723

(22) Filed: Jun. 15, 2001

(65) Prior Publication Data

US 2002/0191013 A1 Dec. 19, 2002

(51) Int. Cl.[7] .................................................. G09G 5/00
(52) U.S. Cl. .................. 715/730; 715/732; 715/781; 715/790; 715/791; 715/802; 719/316; 719/332
(58) Field of Search ............................... 345/730, 731, 345/732, 781, 788, 790, 791, 794, 795, 802, 807; 709/316, 331, 332; 715/500.1, 515, 516

(56) References Cited

U.S. PATENT DOCUMENTS

| | | | | |
|---|---|---|---|---|
| 5,363,482 A | * | 11/1994 | Victor et al. | 345/804 |
| 5,917,480 A | * | 6/1999 | Tafoya et al. | 345/732 |
| 6,008,807 A | * | 12/1999 | Bretschneider et al. | 345/732 |
| 6,084,582 A | * | 7/2000 | Qureshi et al. | 715/500.1 |
| 6,128,629 A | | 10/2000 | Bretschneider et al. | 707/203 |
| 6,133,914 A | * | 10/2000 | Rogers et al. | 345/661 |
| 6,456,305 B1 | * | 9/2002 | Qureshi et al. | 345/800 |
| 6,515,656 B1 | * | 2/2003 | Wittenburg et al. | 345/853 |
| 6,560,637 B1 | * | 5/2003 | Dunlap et al. | 709/204 |
| 2002/0085030 A1 | * | 7/2002 | Ghani | 345/751 |

* cited by examiner

Primary Examiner—Raymond J. Bayerl
Assistant Examiner—Cuong T. Thai
(74) Attorney, Agent, or Firm—Thomas E. Coverstone; Townsend and Townsend and Crew, LLP

(57) ABSTRACT

A slide show presentation "plug-in" that permits the user to control an animated dynamic situation display during a PowerPoint slide-show presentation without interrupting the slide-show mode to edit the slide. A dynamic situation display file is encapsulated in a Slide object linked to a second window. A Replay Plug-In object is embedded in the PowerPoint slide to intercept user interface device (UID) events in the first slide show presentation window. These events are transferred through a COM Server object to the Slide object running in the second window, which uses a Dynamic Display object to control and edit the attributes of the dynamic situation display for replay in the second window overlapping the slide-show window.

32 Claims, 10 Drawing Sheets

METHOD AND SYSTEM FOR INCORPORATING A DYNAMIC SITUATION DISPLAY IN A POWERPOINT SLIDE SHOW PRESENTATION

BACKGROUND OF THE INVENTION

1. Field of the Invention

This invention relates generally to computer-implemented presentations systems and more particularly to an improved method and system for interacting with the content of a dynamic situation display slide during the slide-show presentation mode.

2. Description of the Related Art

Making presentations and conducting meetings are important aspects of many occupations. Executives make presentations to directors, managers conduct meetings with staff, salespersons make presentations to potential customers, doctors conduct meetings with nurses, lawyers make presentations to juries, and so on. A great many professionals conduct and attend meetings and presentations regularly. Much effort therefore goes into creating and delivering effective presentations and conducting effective meetings.

With modern commercial off-the-shelf (COTS) presentation software, conventional computers provide effective platforms for creating and conducting presentations and meetings. Currently available COTS presentation software modules can make a personal computer into a customized presentation system for creating and delivering slide shows. Generally described, these COTS presentation systems provide a specially designed, user-friendly, pallet of tools to assist in the creation of presentation slides for subsequent display to an audience. The Microsoft Power-Point® (MSPP) presentation system, available from Microsoft Corporation of Redmond, Wash., is used by more people throughout the world than are all other COTS presentation systems together. MSPP therefore represents the COTS presentation system of practical interest to users generally. The MSPP presentation system allows slides to be prepared in advance and subsequently presented in sequence to an audience, point-by-point and slide-by-slide, with color, animation, audio, and transition effects that enhance the presentation.

However, it is well known in the art that the MSPP presentation system provides no effective means for interacting with the content of a slide during the course of the presentation. Only two modes of operation are supported; an edit mode and a slide-show mode. A user may create and save a set of presentation slides (as a PPT file) with MSPP in the edit mode, and then subsequently may deliver the presentation by "playing" the PPT file with MSPP in the slide-show mode. Although the MSPP slide-show mode includes a simple means for adding notes to a linked meeting log during the course of the actual slide show presentation, no means are provided to allow the user to interact with the content of slide presentation except by interrupting the slide-show mode and invoking the MSPP edit mode.

In the edit mode, MSPP displays an edit-mode control window on the monitor. The edit-mode control window is typically displayed on a portion of the monitor in front of the computer's desktop display. The desktop display is therefore partially visible in the background area of the monitor. This conventional type of edit-mode display allows the user to move the control window on the display screen to access icons and control items in tool bars associated with the desktop display. Illustrative edit-mode control window functions include text functions such as font size and style, drawing functions such as lines and polygons, background functions such as color and texture, and layout functions such as free-text and bullet-point. The user may also select among four different editing modes: slide-view, outline-view, slide-sorter, and notes-view. Each editing mode corresponds to a different display of information within the viewing field of the edit-mode control window. In the slide-view edit mode, a fully formatted slide may be viewed and edited within the viewing field. In the outline-view edit mode, the content of the slide presentation may be displayed and edited in an outline layout within the viewing field. In the slide-sorter mode, the user may view and change the sequence of a plurality of slides, which are displayed in miniature. In the notes-view edit mode, the user may create and view speaker's notes for each slide.

The MSPP slide-show mode is invoked to deliver the presentation. Each slide is presented to cover the entire viewing area (or a single large window) of the audience display device to avoid distracting the audience with desktop icons and control items of the edit-mode control window, which are therefore not displayed. The slide-show mode allows the user to simply step through the presentation, point-by-point and slide-by-slide, by signaling with a user interface device (UID) such as, for example, a mouse or a keyboard. Each mouse or key click advances the presentation to the next stage by updating the display on the audience display device to show another slide, but no provision for changing slide content is available. Acoustic, animation and transition effects can be embedded within the presentation, by means of multimedia object technology well-known in the art, to enliven the presentation as the speaker steps through the slides. Dynamic multimedia slide presentations can be presented using similar multimedia object technology to show pre-edited files, usually captured as video or animation files. A polished and professional slide presentation can be delivered in the MSPP slide-show mode, which does not afford any editing opportunities.

Manipulating the MSPP system in the edit mode during a presentation is cumbersome because the edit-mode control window includes a numerous small control objects and menu items. Even when considering only the simplest of slide images, interacting with slide content during the slide-show presentation is disruptive, obliging the user to toggle between the slide-show mode and the edit mode. Interacting with a complex animated or multimedia slide during a slide-show presentation is commonly considered to be infeasible because of the delays associated with the detailed revision of animation and multimedia data files.

However, there has long been a clearly-felt need for a system that permits quick unobtrusive revision of animated slides, such as dynamic situation display slides, during presentation. Dynamic situation display presentations are widely used to review the results of a sports contest or a military exercise with an audience that includes the participants. For example, using a simulation application such as the AnalystWorkstation, the details of a military exercise may be carefully recorded in a ReplayStep file containing graphical objects and data representing the second-by-second positions of men and weapons and their individual attributes as they are associated with the terrain, showing actual results of military tactics employed by the participants. Such a ReplayStep file may be used to direct the animation of a graphical image, which may be embedded as a multimedia object within a MSPP slide and presented to an audience including exercise participants. Such an audience may be expected to be active viewers, raising frequent questions about exercise details and proposing hypothetical "what if" scenarios that the audience wishes to see displayed immediately for comparison with the recorded exercise.

Effective education of the participants demands some simple and unobtrusive means for quickly revising and re-presenting an animation of the ReplayStep file in the slide to show the effects of proposed changes in the display of participant positions, additional terrain details, and the like. Because the desired dynamic position display changes are unknown before the presentation, there is no opportunity to edit the ReplayStep file in advance. The effective exploitation of spontaneous requests for revised scenarios requires an improved method and system for interacting with the content of a dynamic situation display slide during the course of the slide-show presentation. The associated unresolved problems and deficiencies are clearly felt in the art and are solved by this invention in the manner described below.

SUMMARY OF THE INVENTION

This invention solves the above-described problem by providing a Microsoft PowerPoint® (MSPP) "plug-in" that permits the user to control and edit an animated dynamic situation display during the slide-show presentation in MSPP without interrupting the MSPP slide-show mode to return to editing mode. This invention arises in part from the unexpectedly advantageous observation that an ActiveX Control may be embedded in the MSPP slide window to intercept user interface device (UID) events for use in operating a separate Dynamic Display application in a second window, which may temporarily overlap the slide show window without interrupting the slide show presentation. A dynamic situation display file containing graphical objects and data representing the step-by-step positions and attributes of all dynamic situation display elements is embedded in a Slide object linked to the second window. A Component Object Model (COM) Server object is instantiated to link the Slide object with a Plug-In object embedded in the MSPP slide to intercept UID events, which are transferred through the COM Server object to the Slide object. Upon accepting a UID event, the Slide object calls the methods of a Dynamic Display object to change the attributes of the objects and data in the dynamic situation display file, which are then used to create an animated display in the second window while overlapping the MSPP slide show window.

In one aspect, the invention is a system for presenting a slide display on a computer system having a user interface device (UID) for accepting user commands and commercial-off-the-shelf (COTS) software for presenting a slide display on a computer-controlled display device in a first window with means for producing UID events responsive to user commands, wherein the system includes a Slide class for instantiating a Slide object encapsulating the slide display in a second window, an Plug-In class for instantiating a Plug-In object associated with the first window and the Slide object with means for accepting UID events, a COM Server class for instantiating a COM Server object associated with the Plug-In object and the Slide object, and a Dynamic Display class for instantiating a Dynamic Display object associated with the Slide object with means for revising the slide display in response to the UID events.

In another aspect, the invention is a machine-implemented method for presenting a slide display on a computer system having a user interface device (UID) for accepting user commands and commercial-off-the-shelf (COTS) software for presenting a slide display on a computer-controlled display device in a first window with means for producing UID events responsive to user commands, the method including the steps of instantiating a Slide object encapsulating the slide display in a second window, instantiating an Plug-In object associated with the first window and the Slide object, instantiating a COM Server object associated with the Plug-In object and the Slide object, instantiating a Dynamic Display object associated with the Slide object, the Dynamic Display object having methods for revising the slide display, accepting a UID event at the Plug-In object, and calling a method on the Dynamic Display object to revise the slide display in response to the UID event.

In an exemplary embodiment, the invention is a computer-program product for use in a computer system including a user interface device (UID) for accepting user commands and commercial-off-the-shelf(COTS) software for presenting a slide display on a computer-controlled display device in a first window having means for producing UID events responsive to user commands, the computer program product including a recording medium, means recorded on the recording medium for directing the computer system to instantiate a Slide object encapsulating the slide display in a second window, means recorded on the recording medium for directing the computer system to instantiate an Plug-In object associated with the first window and the Slide object, means recorded on the recording medium for directing the computer system to instantiate a COM Server object associated with the Plug-In object and the Slide object, means recorded on the recording medium for directing the computer system to instantiate a Dynamic Display object associated with the Slide object, means recorded on the recording medium for directing computer system to accept a UID event at the Plug-In object; and means recorded on the recording medium for directing the computer system to call Dynamic Display object methods to revise the slide display in response to the UID event.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DESCRIPTION OF THE PREFERRED EMBODIMENT

The Computer System

Figure 1:
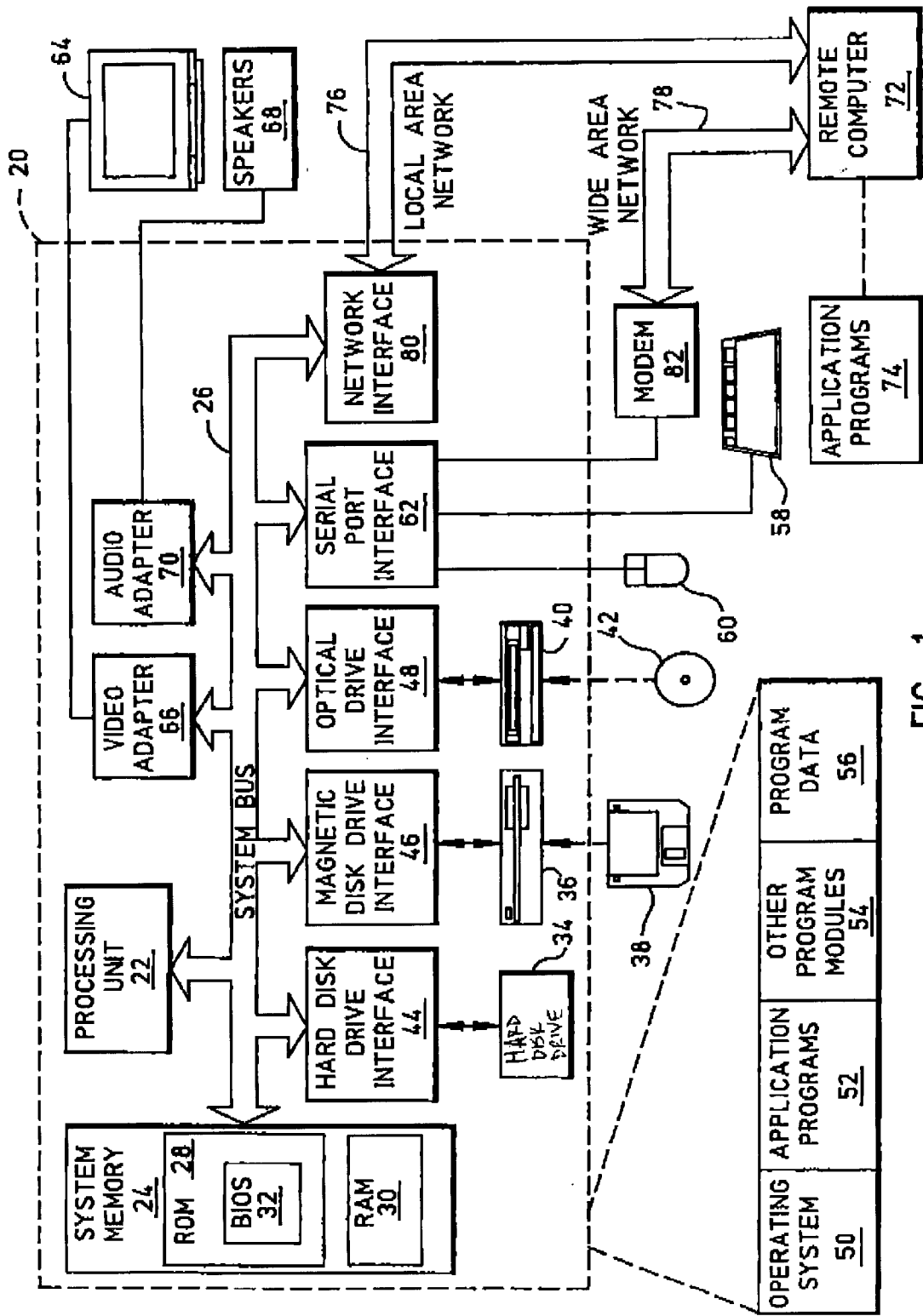
FIG. 1 is a schematic diagram illustrating a computer environment suitable for implementation of this invention.

The system of this invention is preferably practiced in the context of an operating system resident on a computer such as a SUN, IBM PC, or Apple Macintosh computer. FIG. 1 depicts a representative hardware environment suitable for use in accordance with this invention. Although a particular computer may not include all of the elements illustrated in FIG. 1, or may have additional components not shown, most computers include at least some of the elements shown. In accordance with this invention, a slide presentation program executes on a computer, preferably a general-purpose personal computer. FIG. 1 and the following discussion are intended to provide a brief, general description of a suitable computing environment in which the invention may be implemented. Although not required, the invention is described in the general context of computer-executable instructions, such as program modules, being executed by a computer. Generally, program modules include routines, programs, objects, components, data structures, etc., that perform particular tasks or implement particular abstract data types. Moreover, those skilled in the art may appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a central processing unit 22, a system memory 24, and a system bus 26 that couples various system components such as system memory 24 to processing unit 22. System bus 26 may be any of several types of bus structures including a memory bus or memory controller, a peripheral bus, and a local bus using any of a variety of bus architectures. The system memory includes the read-only memory (ROM) 28 and the random-access memory (RAM) 30. A basic input/output system (BIOS) 32 containing the basic routines that helps to transfer information between elements within the computer 20, such as during start-up, is stored in ROM 28. Computer 20 further includes a hard disk drive 34 for storing data on a hard disk (not shown), a magnetic disk drive 36 for reading from or writing to a removable magnetic disk 38, and an optical disk drive 40 for reading from or writing to a removable optical disk 42 such as a compact disk read-only memory (CD-ROM), a digital-versatile disk (DVD) or other optical media. Hard disk drive 34, magnetic disk drive 36, and optical disk drive 40 are connected to system bus 26 by a hard disk drive interface 44, a magnetic disk drive interface 46, and an optical drive interface 48, respectively. The drives 34, 36 and 40 and their associated computer-readable media provide nonvolatile storage of computer readable instructions, data structures, program modules and other data for computer 20. Although the exemplary environment described herein employs a hard disk, a removable magnetic disk 38 and a removable optical disk 42, it may be appreciated by those skilled in the art that other types of computer-readable media for storing computer-accessible data, such as magnetic tape cassettes, flash RAM cards, DVDs, Bernoulli hard-disk cartridges, various ROMs, and the like, may also be used in the exemplary operating environment.

Computer program modules may be stored on the hard disk, magnetic disk 38, optical disk 42, ROM 28 or RAM 30, including an operating system 50, one or more application programs 52 including commercial off-the-shelf (COTS) application programs such as Microsoft PowerPoint (not shown), other program modules 54, and the program data files 56. A user may enter user commands and user information into computer 20 through user input devices (UIDs) such as a keyboard 58 and a pointing device (mouse) 60. Computer 20 may also include other peripheral input devices (not shown), such as a microphone, a joystick, a game pad, a satellite dish, a scanner, or the like. These and other UIDs are typically connected to processing unit 22 through a serial port interface 62 that is coupled to system bus 26, but may alternatively be connected by means of other interfaces (not shown), such as a parallel port, a small computer system interface (SCSI) port, a game port, an Apple desktop bus (ADB) or a universal serial bus (USB). A display device such as the monitor 64 or a projector (not shown) or other type of display device is also connected to system bus 26 via a suitable interface such as the video adapter 66. One or more speakers 68 may also be connected to system bus 26 via a suitable interface such as the audio adapter 70. Computer 20 may also include other peripheral output devices (not shown), such as a printer.

Computer 20 may operate in a networked environment using logical connections to one or more remote computers, such as the remote computer 72. Remote computer 72 may be another computer, a server, a router, a network PC, a peer device or some other common network node. Although an application program memory storage device 74 is alone shown in FIG. 1, remote computer 72 may include many or all of the elements described above in connection with computer 20. The logical connections depicted in FIG. 1 include a local area network (LAN) 76 and a wide area network (WAN) 78. Such networking environments are commonplace in offices, enterprise-wide computer networks, intranets and the Internet. When used in a LAN networking environment, computer 20 may be connected to LAN 76 through a network interface 80. When used in a WAN networking environment, computer 20 may include a modem 82 or similar suitable means for establishing communications over WAN 78, such as routers and gateways (not shown) for the Internet. Modem 82 may be internal or external and may be connected to system bus 26 via serial port interface 62. In a networked environment, application programs 52, program modules54 and program data files 56, or portions thereof, may be stored in remote memory storage device 74. It may be appreciated by those skilled in the art that the network connections shown are exemplary and other suitable means of establishing a communications link between computer 20 and remote computer 72 may be used.

Object-Oriented Software and Object Linking and Embedding

As may be appreciated by those skilled in the art, object-oriented programming (OOP) techniques involve the definition, creation, use and destruction of "objects." These objects are software entities having data elements and routines or functions (methods), that manipulate the data elements. The data and related methods within an object are handled together as an atomic entity and can be created, used and destroyed as a single item. By embodying data and methods together in a single software object, virtually any real-world entity may be modeled in terms of its characteristics, which can be represented by the data elements (attributes), and its behavior, which can be represented by its data manipulation functions (methods). In this way, such objects are widely used to model concrete things like people and computers, and abstract concepts like numbers or geometrical designs.

Objects are defined by creating "classes," which are not objects themselves but which act as software templates that instruct the compiler how to construct the actual object. A class may, for example, specify the number and type of data variables and the steps involved in the methods for manipulating the data. An object is actually created at runtime by a special "constructor" function that uses the corresponding class definition and additional information, such as arguments provided during object creation, to construct the object. Likewise, objects are destroyed by a special "destructor" function. Objects may be used by invoking their methods, some of which make use of the embedded data.

The principle benefits of OOP techniques arise from the three basic OOP principles; encapsulation, polymorphism and inheritance. Objects may use encapsulation to hide (encapsulate) all or a portion of the internal data structure and the internal ("private") methods. Other data or methods may be "public" or available for use by other programs. Private data may be accessed by other programs by invoking public methods that access the object's private data. The public methods of an object form a controlled and consistent "interface" between the private data and the outside world. Thus, encapsulation permits a computer program to be implemented as a collection of largely autonomous components (objects), each of which is responsible for a specific task. Polymorphism is a concept that allows objects and methods with the same overall format to work with different data and to function differently to produce consistent results. Parametric polymorphism allows the same object code for a function to handle arguments of many types but ad hoc polymorphism (overloading) merely reuses the syntax, requiring different code to handle different argument types. Thus, polymorphism allows separate methods with identical names to be encoded for different variable types, which allows the same method to be invoked on different objects with appropriately different results. Inheritance allows easy reuse of pre-existing programs to avoid creating software from scratch. Classes (and the objects which are later created from them) may be declared as related; for example, classes may be designated as subclasses of other base classes. A subclass "inherits" all of the public methods of its base classes just as if these methods appeared in the subclass. Alternatively, a subclass can override some or all of its inherited methods or may modify some or all of its inherited methods merely by defining a new function with the same form (by polymorphism).

Microsoft's Object Linking and Embedding (OLE) is a well-known set of standards for building connectable component software. OLE allows a degree of integration and interchangeability between software modules that share proprietary data. As used herein, "components" denominate reusable self contained pieces of software that provide a stand-alone function, such as printing, facsimile transmission, etc. As such, components can be plugged into (i.e., conjoined with) other components to form a working system as desired. The behavior is specified in terms of operations, functions or methods that the component can perform. Operations are realized by executable code. Conceptually, the data and the code are inextricably bound together in the component. Thus the only distinction between objects and components is that a component may be considered as an independent (stand alone) software object, which is no distinction in general.

OLE, such as OLE Version 2 and ActiveX Controls are marketed by Microsoft Corporation of Redmond, Wash. and are based in part on the Microsoft Component Object Model (COM). The COM specification provides a COTS mechanism for connecting binary object codes of different components. The common feature among all standard OLE connections is that they are glued together with COM. That is, COM is an object-oriented specification for defining interfaces, which are the contact points between components. To that end, COM provides a foundation on which all OLE features are built that is well-known in the art and commercially available to all.

ActiveX Controls are another type of OLE component standard that includes properties, methods and events that enable programmers to add specific (well defined) functions to application programs and are well-known to those skilled in the art. As used herein, the term "ActiveX Control" has no specific technical meaning other than a stand-alone object that inherits standard COM interfaces suitable for embedding (as a plug-in) in other OLE-standard software objects. An ActiveX Control is an object with properties such as color, shape and event notifications. COM and ActiveX specify the "how" of binary component interaction; how a client finds a server and activates it, how a client determines the capabilities of an object, how calls get marshaled from one process or machine to another. COM in itself does not address the "what" of component software, the meaning of the calls that go back and forth. Being self-contained objects, ActiveX Controls are portable and insertable into any container or applications program as a "plug-in." As used herein, a "container application"(or an "OLE control container" or an "object container") denominates any working computer program that includes within it OLE components and objects. For example, Microsoft products such as the later releases of Office Suite, including Microsoft PowerPoint (MSPP), and Windows Operating System are container applications suitable for the embedding of an ActiveX Control (plug-in). In such an environment, a control may also be considered as a special-purpose window (i.e., a "child window") that sends messages or event notices to a parent window in a container program.

The Slide Presentation Program

Figure 2:
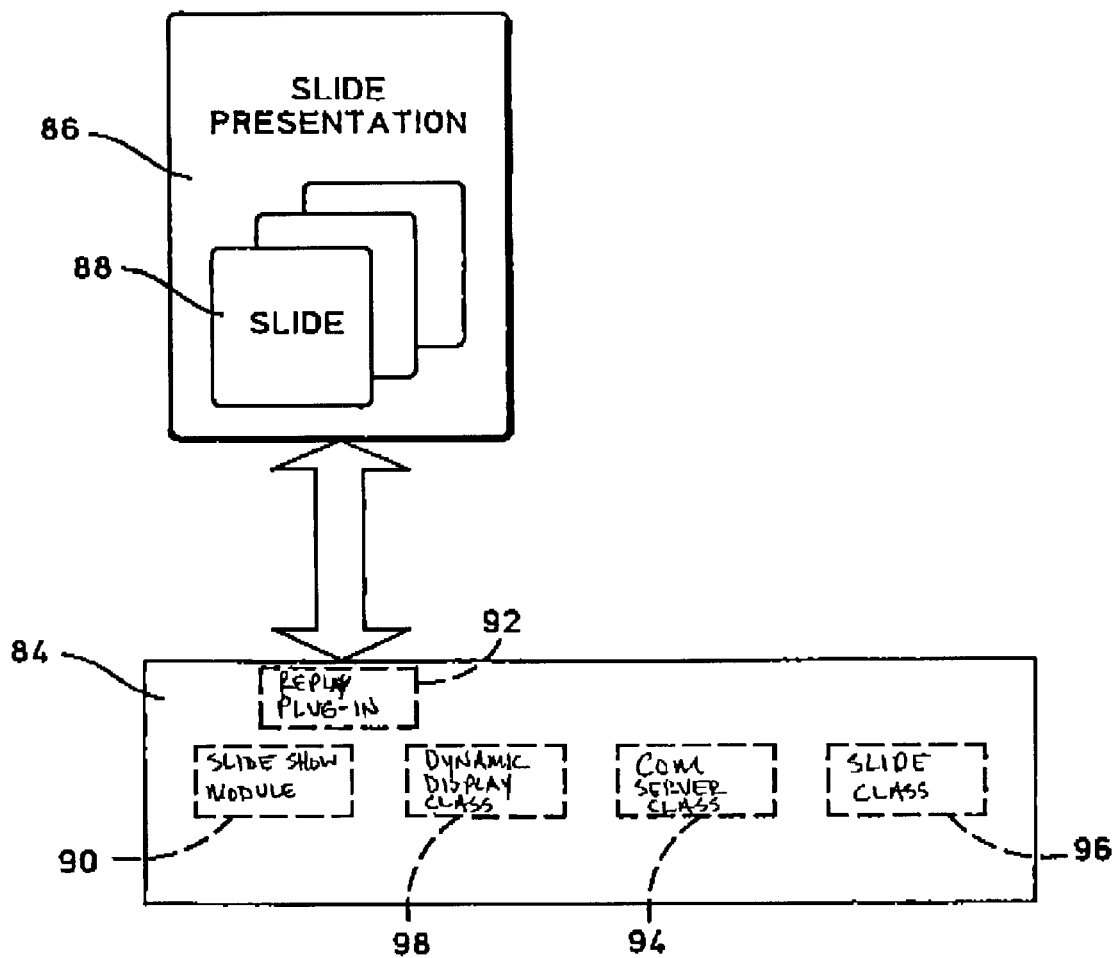
FIG. 2 is a schematic diagram illustrating the system of this invention.

FIG. 2 illustrates an architecture of a slide presentation program 84 (such as MSPP) in accordance with this invention. Slide presentation program 84 provides an author with the ability to create and edit a set 86 of one or more "slides" (exemplified by the slide 88) and to "present" (display) one or more of the set 86 of slides. Slide presentation 86 is generally stored in memory or on a computer storage medium, such as a disk drive. A slide is a discrete collection of information, including visual information such as text, graphic images, video, or animation. A slide may also embrace other information, including sounds and interactive information, such as hyperlinks.

Slide presentation program 84 preferably includes a COTS slide show module 90 (such as the slide show mode of MSPP) that contains program code for controlling an electronic slide show. During an electronic slide show, COTS slide show module 90 retrieves slide 88 and displays it in a window 100 (FIG. 3) on an output medium, such as display monitor 64 (FIG. 1). Because slide 88 may contain multimedia data, displaying slide 88 includes playing audio or video data, as well as visually displaying the contents of the slide. Specifically, displaying slide 88 includes displaying the text and graphics contained within slide 88, which may include animation, and the capability to present a "video clip" or a "sound clip," if any, embedded in slide 88. A sound clip is a block of data representing sound, and can be stored in one of several available storage formats, such as WAVE, Musical Instrument Digital Interface (MIDI), or the Audio Interchange File Format (AIFF). A video clip is a block of data representing motion video and sound, and can be stored in one of several available storage formats, such as Moving Pictures Experts Group (MPEG) or Audio Video Interleaved (AVI) format. As used herein, the display of video in a slide presentation includes, for example, the non-interactive animated display of a dynamic situation file containing graphical objects and data that may represent details of a military exercise such as the second-by-second map positions of men and weapons and their individual attributes as they are associated with the terrain during a military exercise.

COTS slide show module 90 provides several options for presenting an electronic slide show. A predetermined sequence of slides with each slide displayed for a corresponding predetermined amount of time is one option. Alternatively, each slide, exemplified by slide 88, may be displayed in a predetermined sequence with a pause after each until a user performs a UID operation creating an event to advance to the next slide in the sequence. Slide 88 may also have "links" plugged into it by the slide author using a slide creation module (not shown, but possibly included in slide presentation program 84). Such a link may include a visual area on the slide and a corresponding address of a target slide. When a user selects the link area on the visible slide, slide show module 90 retrieves and displays a target slide designated by the link. The target slide may be from a different slide presentation and/or located on a remote computer accessible over a WAN, such as the Internet. A link may also refer to a resource on a local storage medium, such as a CD-ROM drive. Target resources may include clip art, videos, sound clips, graphic effects, templates, text files, spreadsheets, documents, or database macros.

When slide 88 includes the system of this invention, a Replay Plug-In 92 is embedded in slide 88. Replay Plug-In 92 is implemented as an ActiveX Control linked to COTS slide presentation program 90 through its linkage to slide 88, which is more particularly described below in connection with FIG. 3. COTS slide-show applications with OLE capability, such as Microsoft PowerPoint (MSPP), provide the ability to link such supplemental programs to extend the capabilities of COTS slide presentation program 90. The later editions of the Microsoft Office 2000 Visual Basic Programmers Guide (published by Microsoft Press) contains information about incorporating plug-ins in MSPP. As may be recognized by those skilled in the art of computer programming, the functionality of Replay Plug-In 92 can be implemented without undue experimentation as an ActiveX Control embedded in slide 88.

FIG. 2 also shows a schematic representation of the other elements of this invention, which are not embedded in but are linked to slide presentation program 84. The other elements include the COM Server class 94, and the Slide class 96 and the Dynamic Display class 98. As used herein, Dynamic Display class 98 and Slide class 96 are implemented preferably in Java and each may include numerous sub-classes. These elements of this invention are now more particularly described.

The Replay Plug-In Class

Figure 3:
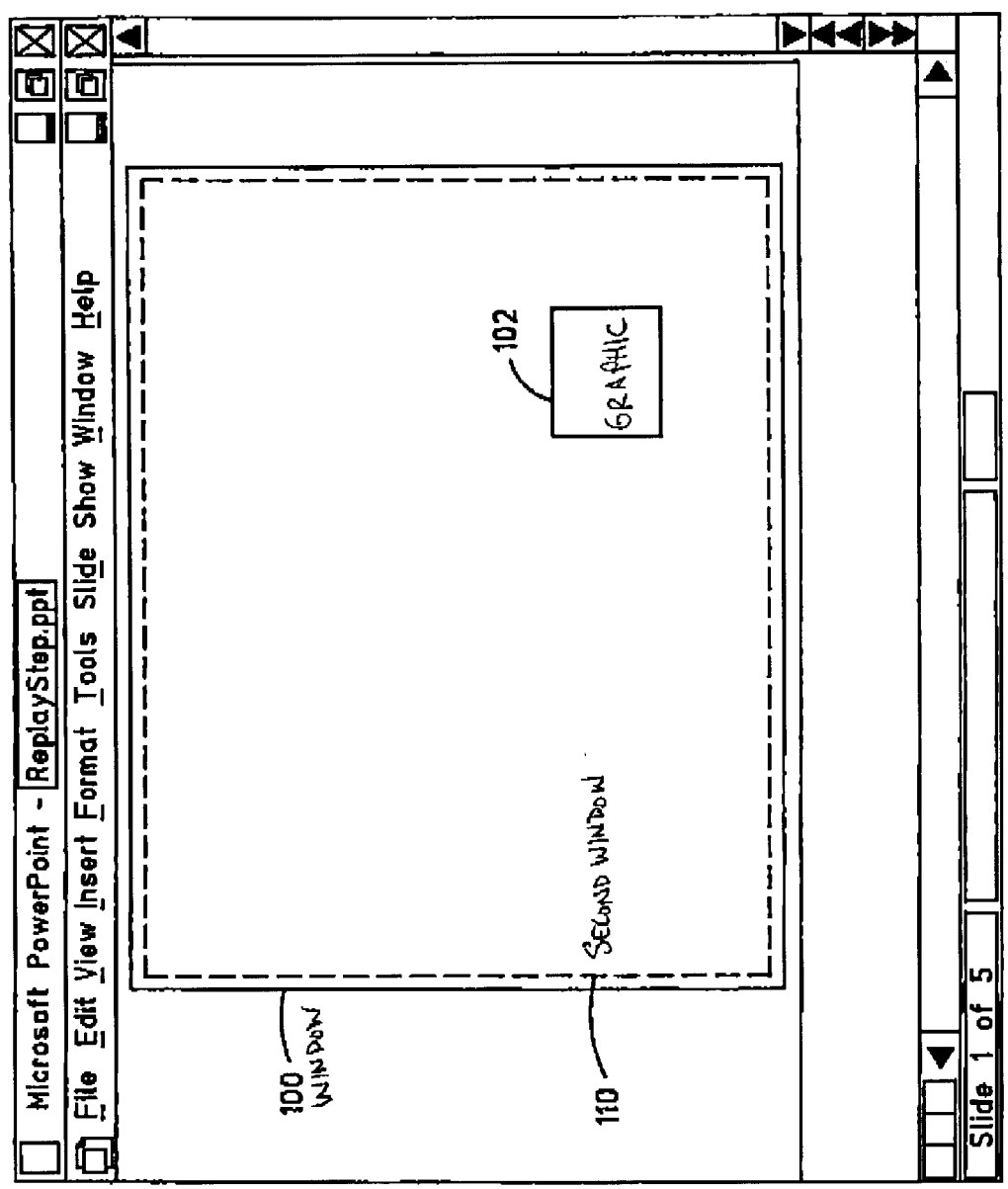
FIG. 3 is a diagram illustrating the Microsoft PowerPoint (MSPP) edit-mode display window.
Figure 4:
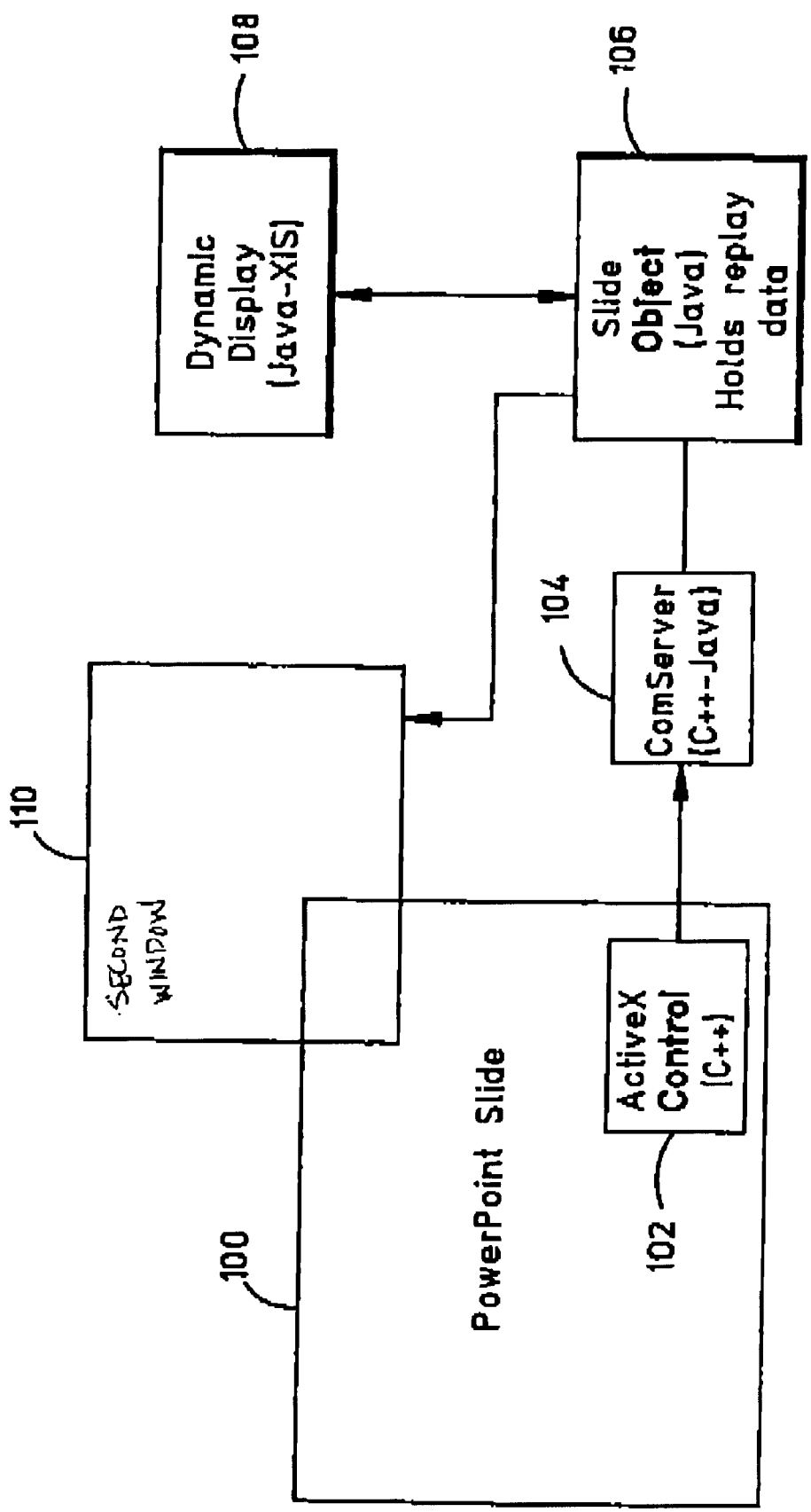
FIG. 4 is a block diagram illustrating the MSPP plug-in and the basic related classes of this invention.

Referring to FIGS. 2-4, an instance of the Replay Plug-In class 92 of this invention is embedded in a MSPP slide in window 100 so that its presence is marked with a graphic 102 when the parent slide is displayed. The Replay Plug-In instance represented by graphic 102 exposes four events: Play, Stop, Show, and Hide to the COM interface, which adds the events to the custom animation dialog. Replay Plug-In instance 102 should intercept UID (for instance, mouse or keyboard) events in window 100 to provide the following basic functions:

(1) Show and Hide a dynamic situation display presentation in a second window; and (2) Load, Play and Stop the dynamic situation display presentation.

The Replay Plug-In instance represented by graphic 102 is displayed in slide display window 100 with methods to draw the associated bitmap 102 and to hand the requisite UID events to the COM Server object 104. The Replay Plug-In instance represented by graphic 102 commands other objects to load an associated ReplayStep file (not shown) into a map image (not shown) and then shows, hides, plays or stops the map animation when necessary, responsive to user-initiated UID events. Other functions may be provided within the second window 110, limited only by what the underlying MSPP and operating system services can provide.

Replay Plug-In class 92 is preferably written in C++ and should conform to the existing OLE standards for plug-ins, such as those required of Microsoft ActiveX objects. Given the above summary of the requisite Replay Plug-In functions, a general knowledge of how to write plug-ins (e.g., of how to write ActiveX objects), and a knowledge of the relevant application programming interface (API) for controlling the display of the associated animation file (such as the ReplayStep file), a person skilled in the art may readily and without undue experimentation develop a working version of the Replay Plug-In class of this invention.

The COM Server Class

Referring again to FIGS. 2-4, COM Server class 94 instantiates COM Server instance 104, which connects a Replay Plug-In instance (shown as ActiveX Control graphic 102) to a Slide instance 106. COM Server object 104 exposes an interface of Slide class 96 that accesses several methods in a Dynamic Display class instance 108 to operate the animation of the ReplayStep file. This is accomplished by accepting C++ method calls from Replay Plug-In instance linked to graphic 102 and issuing corresponding Java method calls to the interface of Slide instance 106. For most purposes, Replay Plug-In instance 102 may be considered as making method calls directly to Slide instance 106, which is specially coded to handle the dynamic situation display animation of the particular ReplayStep file (not shown) associated with Slide instance 106.

The COM model allows Replay Plug-In instance 102 to use the interface of COM Server instance 104 without any knowledge of the attributes of Slide class 96. COM uses a globally-unique identifier to determine the local or remote location of Slide instance 106. The interfaces are represented by an Interface ID that is fixed for the particular methods according to the COM concept of immutability. As long as the COM mapping mechanism knows where to find COM Server object 104 and Replay Plug-In instance 102 knows the COM Server interface methods, the application of this invention is ready to run. Given a general knowledge of how to write COM Server objects, and a knowledge of the relevant API for controlling the display of the associated interaction file (for example, a ReplayStep dynamic situation display file), a person skilled in the art may readily and without undue experimentation develop a working version of the COM Server class of this invention.

The Slide Class

Referring again to FIGS. 3-4, Slide Class 96 is preferably implemented in Java (but could be implemented in any suitable language) to hold the dynamic situation display data that is to be displayed under control of Replay Plug-In instance 102 and to request display and editing services from Dynamic Display object 108. For example, as used herein, Slide object 106 encapsulates a map and a ReplayStep file (not shown) containing objects and data representing details of a military exercise including the second-by-second map positions of men and weapons and their individual attributes as they are associated with the terrain during a military exercise as well as artillery firing effects on the battlefield, weapon firing events by men and vehicles and other information made available for the replay. Slide object 106 presents the ReplayStep file and map data to Dynamic Display object 108 for use in controlling the map display with the desired animation. Slide object 106 displays the map animation in a second window 110 (an instance of JWindow when using Java) that is modified with a Java Native Interface (JNI) method call to overlap MSPP slide display window 100. This second window 110 appears no different from the original MSPP window 100 to the slide-show audience. Moreover, second window 110 can be configured to either completely overlay and cover MSSP slide display window 100 or partially cover so as to appear as an embedded window within the boundaries of MSSP slide display window 100.

Slide class 96 is specially adapted to make calls to instance 108 of Dynamic Display class 98 to animate the particular dynamic situation data in the associated ReplayStep file (not shown) for display in second window 110, which may overlap window 100. Those skilled in the art may easily appreciate that a different Slide class that also implements the interface of COM Server class 94 may be written without undue experimentation to specifically handle another dynamic situation display animation application embodied as a different Dynamic Display class. For example, a Sail-Track Slide class (not shown) for animating an incoming stream of real-time data representing the relative positions and other attributes of a group of yachts engaged in a formal race at sea may call appropriate methods on a Sail-Track Dynamic Display class (not shown) and provide for the display of the animation in second window 110 overlapping display window 100 managed by COTS slide show module 90 under control of Replay Plug-In object 92 (FIGS. 2-3). Such a Sail-Track Slide class may encapsulate an incoming dynamic situation display data stream and/or a stored record of an earlier yacht race for animation by a Sail-Track Dynamic Display class. According to this invention, such a Sail-Track animation may be interactively revised during presentation through Replay Plug-In object 102 without leaving the MSPP slide-show presentation mode.

Given a general knowledge of how to write multimedia objects, and a knowledge of the relevant API for controlling the display of the associated multimedia video file (for example, a ReplayStep dynamic situation display file), a person skilled in the art may readily and without undue experimentation develop a working version of the Slide class of this invention.

The Dynamic Display Class

Referring again to FIGS. 3-4, Dynamic Display class 98 includes all of the ReplayStep slide animation classes, which are preferably implemented as Java classes but could be implemented in any suitable language. Dynamic Display class 98 includes a class that controls the animation of the ReplayStep file data encapsulated by Slide object 106 during the MSPP slide show. Dynamic Display class 98 provides the basic map manipulation services needed during the operation of the dynamic situation display replay. A separate class within Dynamic Display class 98 controls the map animation, which is added to Slide object 106, which in this case extends from a Java Window class to show the animation in window 110 overlapping MSPP window 100.

Given a general knowledge of how to write multimedia objects, and a knowledge of the relevant API for controlling the display of the associated animation file (for example, a ReplayStep dynamic situation display file), a person skilled in the art may readily and without undue experimentation develop a working version of the Dynamic Display class of this invention.

An Exemplary Embodiment

Figure 5:
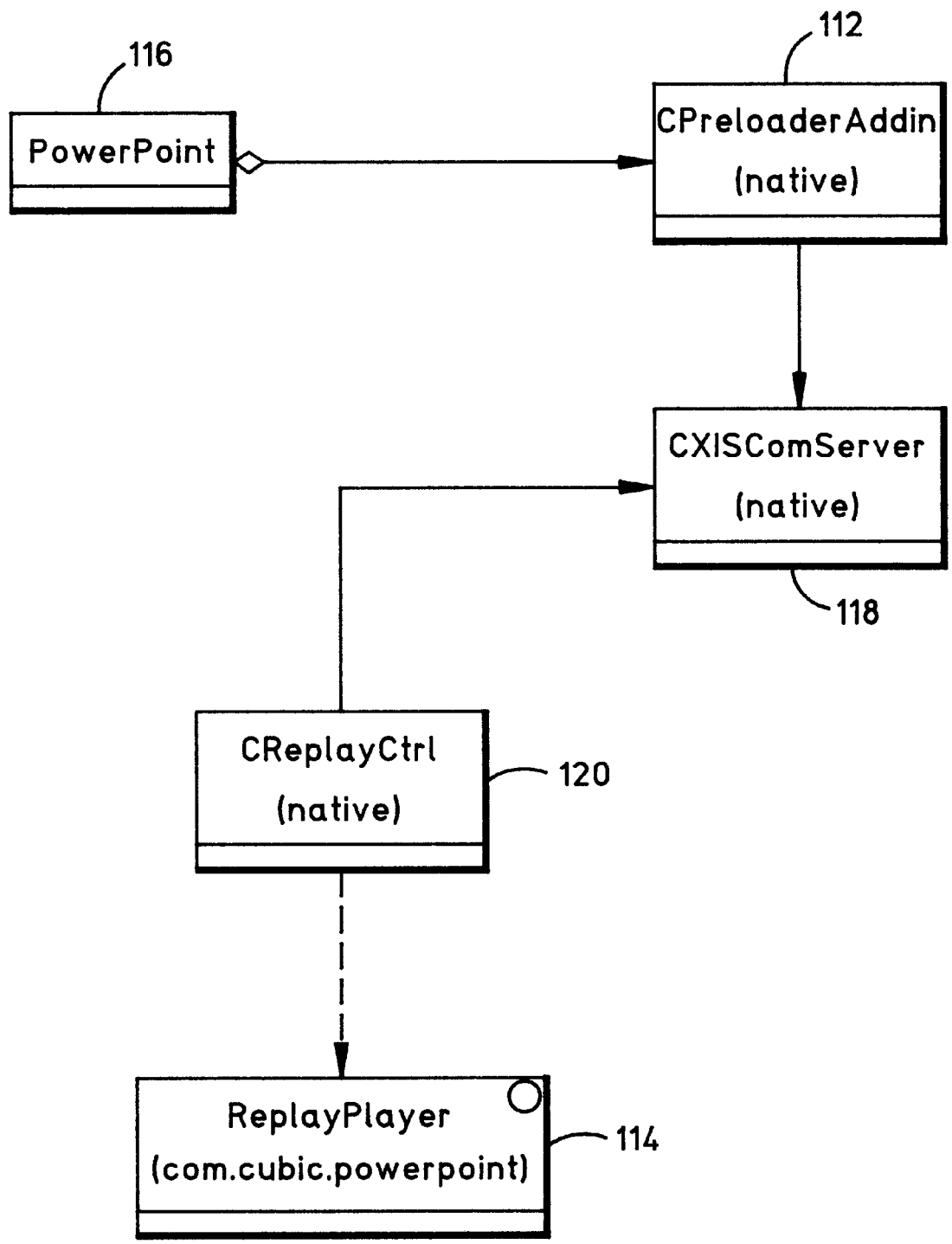
FIG. 5 is a Universal Modeling Language (UML) class diagram illustrating the MSPP plug-in and the basic related classes of an exemplary embodiment of this invention.
Figure 6:
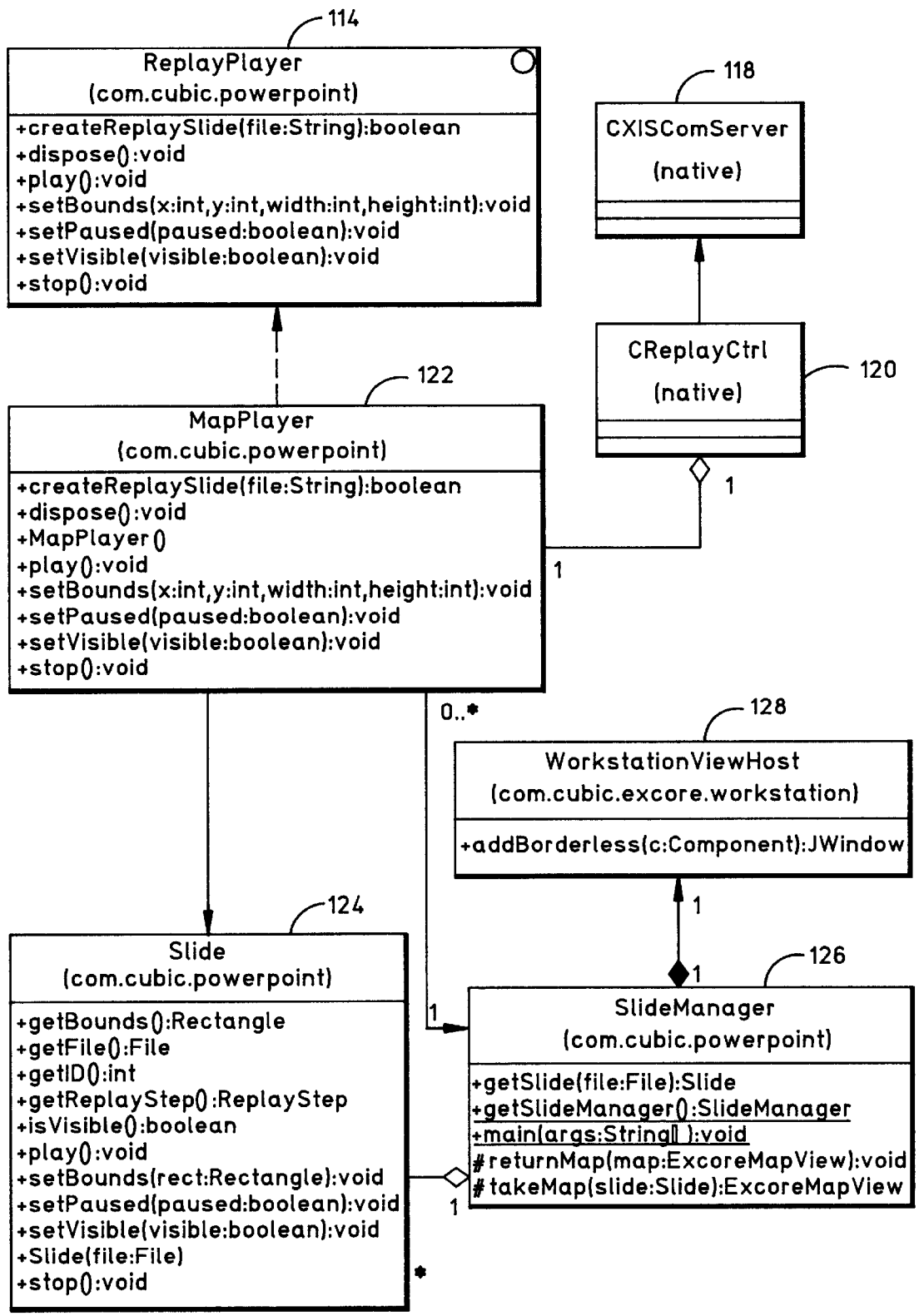
FIG. 6 is a UML class diagram illustrating the Replay-Player and related classes of the exemplary embodiment of FIG. 5.

Referring to FIGS. 5-6 (et seq), an exemplary embodiment of this invention is now described. FIG. 5 is a unified modeling language (UML) class diagram illustrating an exemplary embodiment of the software classes of this invention. An instance of a native CPreloaderAddIn class 112 expedites the loading of an instance of the ReplayPlayer class 114 (an embodiment of an element of the Dynamic Display class 108 of this invention) by loading at the startup of MSPP 116. The ReplayPlayer 114 instance must be started before a replay can be animated in a PowerPoint slide. To avoid unpleasant delays when viewing a Replay Control slide for the first time, ReplayPlayer 114 is preferably pre-loaded when the slide show is started, but even if ReplayPlayer is not pre-loaded, it is automatically loaded when required. At the same time, an instance of the CXISCOMServer class 118 (an embodiment of the COM Server class of this invention) is loaded to be ready for method calls from any instances of the CReplayCtrl class 120 (an embodiment of the Replay Plug-In class of this invention). For each type of Replay Control file, there is only one instance of CXISCOMServer class 118 and only one instance of ReplayPlayer class 114 required, but several concurrent instances of CReplayCtrl class 120 may be accommodated.

FIG. 6 is a UML class diagram illustrating ReplayPlayer interface class 114 and related classes of the exemplary embodiment from FIG. 5. The MapPlayer class 122 implements the ReplayPlayer interface class 114 and has a one-to-one relationship to the Slide class 124 (an embodiment of the Slide class of this invention) and a many-to-one relationship to the SlideManager class 126 to manage the animation of a ReplayStep file. The Slide class 124 and the SlideManager class 126 both have associations to MapPlayer class 122. The WorkStation-ViewHost class 128 provides the display in the second window, which can be forced to overlap the primary MSPP slide-show window. MapPlayer class 122, Slide class 124, SlideManager class 126 and WorkStationViewHost class 128 together form an exemplary embodiment of the Dynamic Display class of this invention. Given the information and UML relationships shown in FIGS. 5-6, a person skilled in the art may readily and without undue experimentation develop a working version of the software elements of this invention.

Figure 7:
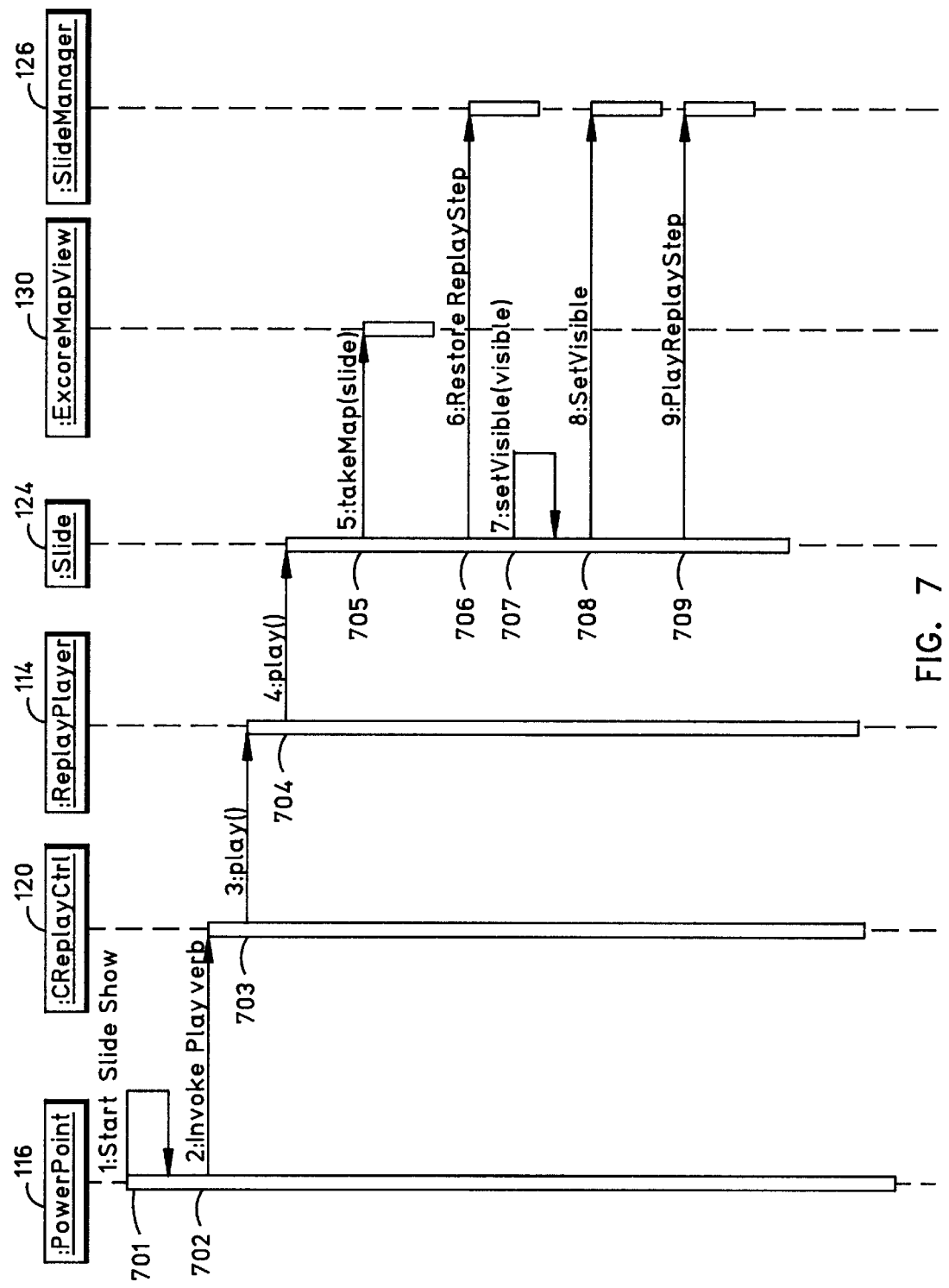
FIG. 7 is a UML interaction diagram illustrating an exemplary embodiment of the method of this invention for starting the play of a dynamic situation display slide.

FIG. 7 is a UML interaction diagram illustrating the method for starting the play of a dynamic situation display slide in the exemplary embodiment of FIGS. 5-6 assuming that the ReplayPlayer has already been started. MSPP 116 first starts a slide show at step 701. Subsequently, a user creates a UID Play event in MSPP 116 when MSPP goes to the slide that holds CReplayCtrl instance 120. The Play event is captured by CReplayCtrl instance 120 at step 702. Responsively, CReplayCtrl instance 120 calls the Play( ) method of ReplayPlayer instance 114 at step 703. ReplayPlayer instance 114 responsively calls the Play( ) method of Slide instance 124, which starts a chain of activity. At step 705, Slide instance 124 calls the TakeMap(slide) method of the ExcoreMap View instance 130, which is an aspect of WorkStationViewHost 128, to load the underlying map display from the slide. ExcoreMapView instance 130 performs the method and exits. At step 706, Slide instance 124 calls the Restore ReplayStep method of SlideManager instance 126, which sets up the various ReplayStep graphical display objects corresponding to the initial state of the replay and exits. At step 707, Slide instance 124 calls the setVisible(visible) method to bring the second window up on top of the PowerPoint slide window and sends this command to SlideManager instance 126 at step 708. Finally, at step 709, Slide instance 124 commands SlideManager instance 126 to PlayReplayStep, thereby initiating the display animation of the various ReplayStep graphical display objects superimposed on the bitmap graphic as they change relative positions over time. Interactions by the user within the: ExcoreMapView are handled as user interaction commands to the replay function, allowing interactive control of the replay content.

Figure 8:
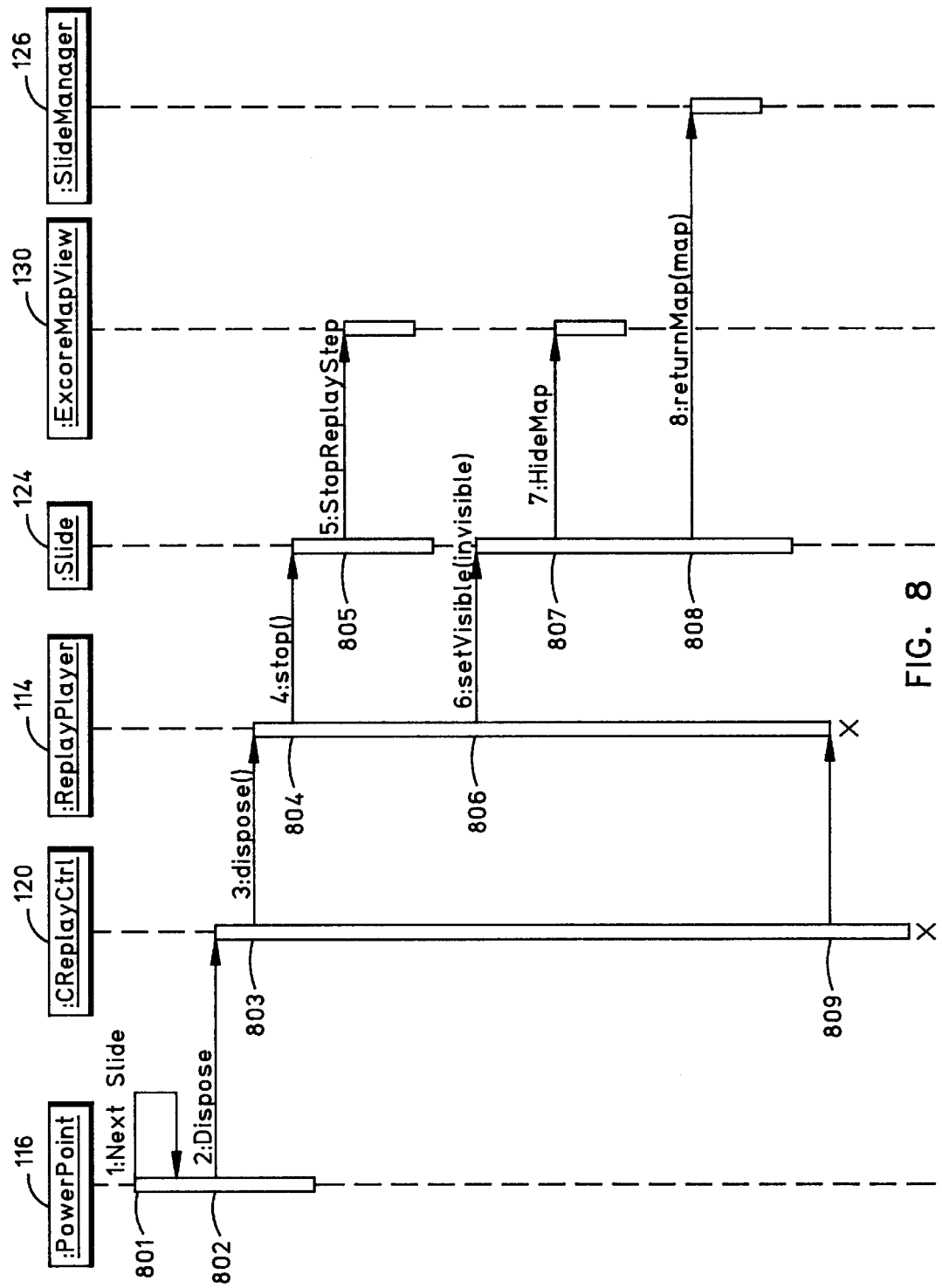
FIG. 8 is a UML interaction diagram illustrating an exemplary embodiment of the method of this invention for ending the play of a dynamic situation display slide.

FIG. 8 is a UML interaction diagram illustrating the method for ending the play of a dynamic situation display slide in the exemplary embodiment of FIGS. 5-6. MSPP 116 initiates a NextSlide command at step 801 in response to MSPP moving to a new slide responsive to a user-initiated UID event or a timer event. This is followed by a Dispose event sent to CReplayCtrl instance 120 at step 802. CReplayCtrl instance 120 responsively calls the Dispose( ) method of ReplayPlayer instance 114 in step 803 and ReplayPlayer instance 114 calls the stop( ) method of Slide instance 124 at step 804. In step 805, Slide instance 124 sends a StopReplayStep message to ExcoreMapView instance 130. At step 806, ReplayPlayer instance 114 calls the setVisible(invisible) method of Slide instance 124, which responsively sends a HideMap message to ExcoreMapView instance 130 at step 807 and a ReturnMap (map) message to SlideManager instance 126 at step 808 to recover the background map used in the slide. At step 809, ReplayPlayer instance 114 and, shortly thereafter, CReplayCtrl instance 120 dispose themselves.

Figure 9:
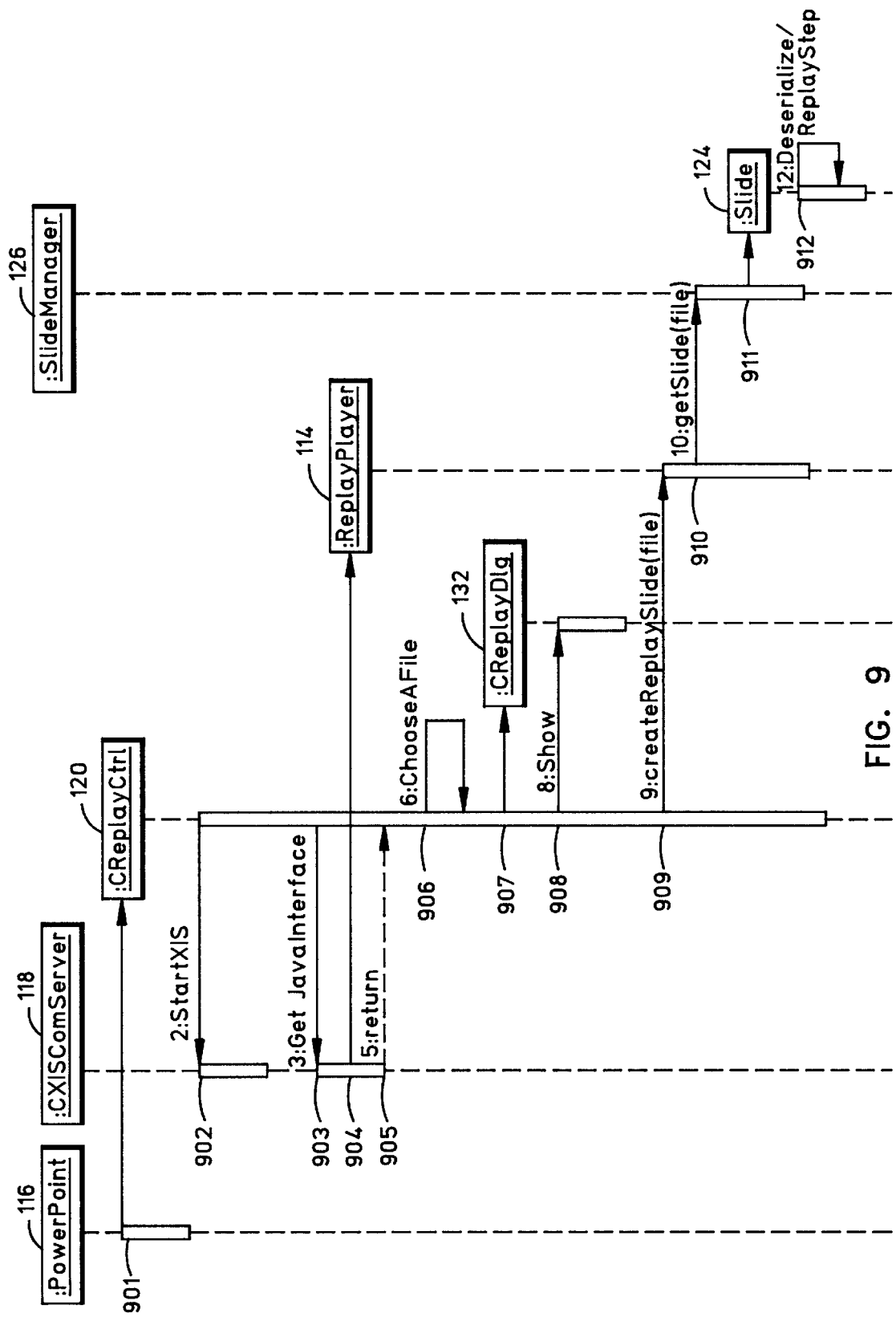
FIG. 9 is a UML interaction diagram illustrating an exemplary embodiment of the method of this invention for editing a dynamic situation display slide during MSPP slide show mode.

FIG. 9 is a UML interaction diagram illustrating the method for creating and/or editing a dynamic situation display slide in the exemplary embodiment of FIGS. 5-6. CXISCOMServer instance 118 is shown as preloaded as is SlideManager instance 126. Within MSPP, the user selects to 'Add Object' followed by selection of a 'Replay Object.' This initiates the following sequence. At step 901, MSPP 116 creates CReplayCtrl instance 120, which initiates CXISCOMServer instance 118 at step 902 and requests a link to the ReplayPlayer instance 114 interface from CXISCOMServer instance 118 at step 903. In step 904, CXISCOMServer instance 118 creates ReplayPlayer instance 114 and returns the interface linkage to CReplayCtrl instance 120 at step 905. At this point the user is prompted to select a previously-prepared dynamic ReplayStep file using a standard file chooser. In step 906, CReplayCtrl instance 120 selects the ReplayStep file to be displayed and creates the CReplayDlg instance 132 (from a closely related menu class) at step 907. The invocation of CReplayDlg allows the user to enter specific information about how the dynamic step should be controlled. The following steps may be performed in response to UID events created during the MSPP slide-show mode. At step 908, CReplayCtrl instance 120 gives a Show message to CReplayDlg instance 132 and sends createReplaySlide(file) messages to ReplayPlayer instance 114 at step 909. ReplayPlayer instance 114 calls the getSlide(file) method of SlideManager instance 126 in step 910 and SlideManager instance 126 creates Slide instance 124 at step 911. In step 912, Slide instance 124 assembles and prepares the ReplayStep graphical display objects and data with the associated map. The method discussed above in connection with FIG. 7 may now be invoked to play the slide thereby created or edited.

Figure 10:
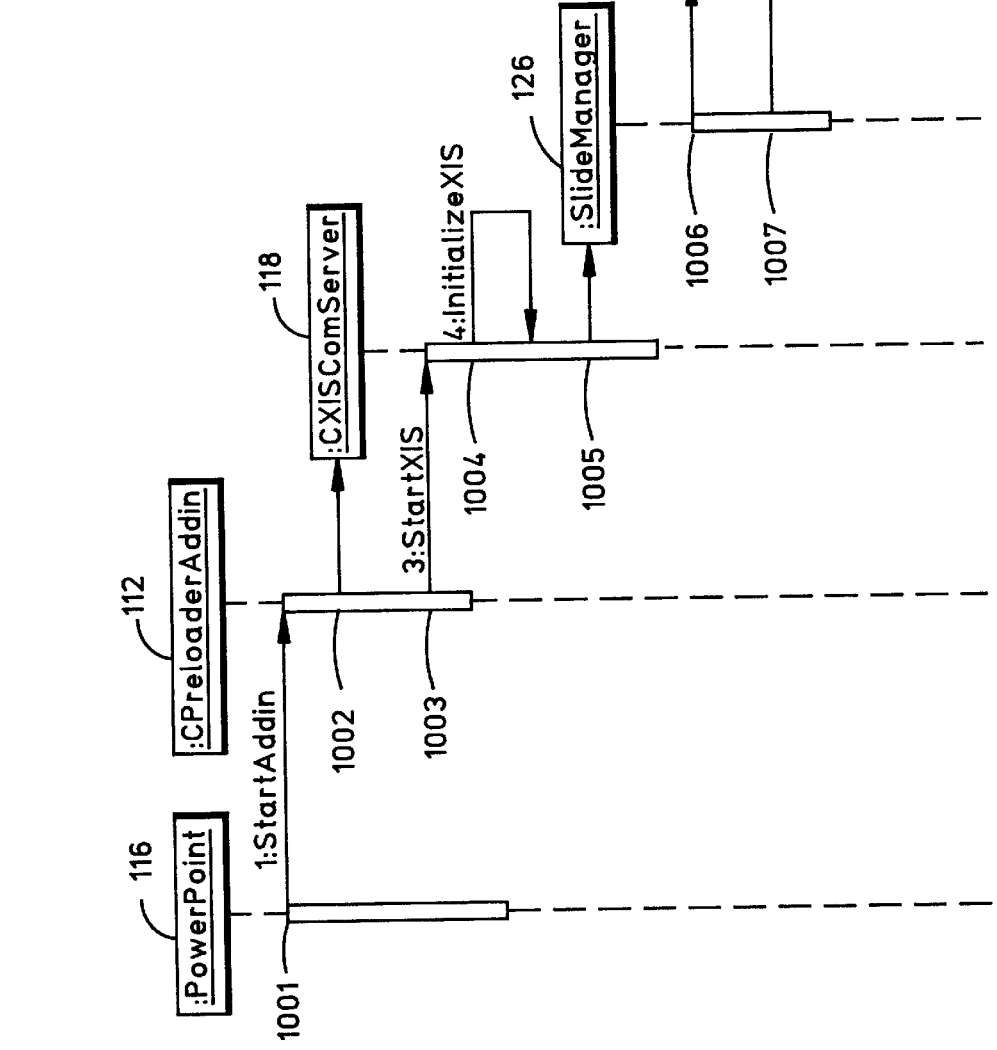
FIG. 10 is a UML interaction diagram illustrating an alternative method of this invention for preloading the dynamic situation display slide classes during MSPP startup.

FIG. 10 is a UML interaction diagram illustrating a method for preloading the dynamic situation display slide classes during MSPP startup in the exemplary embodiment of FIGS. 5-6. MSPP 116 sends a StartAddIn message to CPreloaderAddIn instance 112 at step 1001. CPreloaderAddIn instance 112 then creates CXISCOMServer instance 118 at step 1002 and sends a StartXIS message to it at step 1003. CXISCOMServer instance 118 initializes at step 1004 and creates SlideManager instance 126 at step 1005. SlideManager instance 126 creates WorkStationViewHost instance 128 at step 1006 and creates ExcoreMapView instance 130 at step 1007. This completes the preloading of all instances whose instantiation is most likely to result in noticeable delay during a slide show.

In operation, the ReplayStep file described above is first created using an instance of an AnalystWorkstation class, which provides methods for generating and displaying a file containing graphical display objects and data representing details of a military exercise such as the second-by-second map positions of men and weapons, their weapon interactions and their individual attributes as they are associated with the terrain during a military exercise. When the AnalystWorkstation object saves the file (e.g., MyReplay) it saves a ReplayStep file that contains all of the replay graphical display objects and their attributes (MyReplay.rpl) and a bitmap image snapshot of the map view at the time of the save (MyReplay.bmp) that is shown on the MSPP slide before replay execution. To prepare a presentation in PowerPoint containing a slide with a ReplayStep, the user must add a CReplayCtrl instance (the ActiveX control) to the Power Point slide. This is done by invoking the MSPP menu item "Insert/Object" and choosing "Replay Control" with the "create new" radio button selected. This creates an instance of CReplayCtrl and adds it to the slide. Immediately, the CReplayCtrl object invokes a user dialog box that asks the user, in a File browser window, to identify the Replay Step file to be used for this slide. When a file (e.g., Test.rpl) is selected, the CReplayCtrl instance associates with that file and looks for the corresponding bitmap (e.g., Test.bmp) in the same directory, associating with the bitmap as well, if found. File associations are changed by invoking the "Replay Control/Properties" menu item for the CReplayCtrl instance.

When CReplayCtrl is instantiated, it invokes an instance of the CXISCOMServer unless the CPreloaderAddIn class has already done so. The CXISCOMServer instance instantiates a singleton instance of the AnalystWorkstation class to cooperate with the PowerPoint CReplayCtrl instance. To complete preparations, invoke the Custom Animation CReplayCtrl menu item and select the Multimedia Settings tab. Choose either Play or Show in the ObjectAction drop down list, depending on the desired functionality. Play reveals the replay window when the slide is shown and automatically start animation. Show reveals the replay when the slide is shown and waits for a Play command. To select the UID action required for these commands, select the Order & Timing CReplayCtrl menu item tab and select the desired settings in the Start Animation section.

Figure 11:
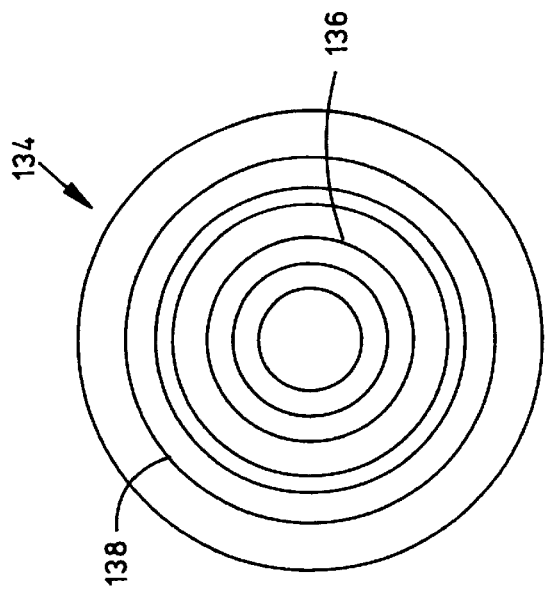
FIG. 11 is a schematic diagram illustrating an exemplary CD-ROM computer program product of this invention.

FIG. 11 is a schematic diagram illustrating an exemplary CD-ROM computer program product 134 of this invention on which are recorded binary data for directing a computer system (FIG. 1) to perform the method of this invention. For example, the recorded data block 136 may include the COM Server class of this invention and the recorded data block 138 may include the Dynamic Display class of this invention. Those skilled in the art may appreciate that a computer program product such as CD-ROM 134 may be used in conjunction with the computer system discussed above in connection with FIG. 1 to practice this invention.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. In a computer system having a user interface device (UID) for accepting user commands and commercial-off-the-shelf (COTS) software for presenting a slide display on a computer-controlled display device in a first window with means for producing UID events responsive to user commands, a system for presenting the slide display comprising:

a Slide class for instantiating a Slide object encapsulating the slide display in a second window;

a Plug-In class for instantiating a Plug-In object associated with the first window and the Slide object with means for accepting UID events;

a Component Object Model (COM) Server class for instantiating a COM Server object associated with the Plug-In object and the Slide object; and a Dynamic Display class for instantiating a Dynamic Display object associated with the Slide object with means for revising the slide display in response to the UID events.

2. The system of claim 1 further comprising:
means for superimposing the contents of the second window over the first window during the slide display presentation.

3. The system of claim 2 wherein;
the first window is an element of COTS slide-show presentation software.

4. The system of claim 3 wherein:
the COTS slide-show presentation software includes a commercial version of Microsoft PowerPoint.

5. The system of claim 1 wherein:
the Slide object encompasses a plurality of graphical display objects each having attributes and each corresponding to an element of a dynamic situation display.

6. The system of claim 5 wherein:
the UID events include events representing user commands to Play, Stop, Show and Hide the slide display.

7. The system of claim 6 wherein:
the Dynamic Display class includes methods for revising the attributes of at least one of the graphical display objects.

8. The system of claim 5 wherein:
at least one of the graphical display objects has attributes that are updated in response to dynamic situation data arriving from outside the system.

9. The system of claim 1 wherein:
the first window is an element of a commercial version of Microsoft PowerPoint.

10. The system of claim 1 wherein:
the UID events include events representing user commands to Play, Stop, Show and Hide the slide display.

11. In a computer system having a user interface device (UID) for accepting user commands and commercial-off-the-shelf (COTS) software for presenting a slide display on a computer-controlled display device in a first window with means for producing UID events responsive to user commands, a machine-implemented method for presenting the slide display comprising the steps of:
instantiating a Slide object encapsulating the slide display in a second window;
instantiating a Plug-In object associated with the first window and the Slide object;
instantiating a Component Object Model (COM) Server object associated with the Plug-In object and the Slide object;
instantiating a Dynamic Display object associated wit the Slide object, the Dynamic Display object having methods for revising the slide display;
accepting a UID event at the Plug-In object; and
calling a method on the Dynamic Display object to revise the slide display in response to the UID event.

12. The method of claim 11 further comprising the step of:
superimposing the contents of the second window over the first window during the slide display presentation.

13. The method of claim 12 wherein:
the first window is an element of COTS slide-show presentation software.

14. The method of claim 13 wherein:
the COTS slide-show presentation software includes a commercial version of Microsoft PowerPoint.

15. The method of claim 11 further comprising the step of:
instantiating a plurality of graphical display objects associated with the Slide object, each graphical display object having attributes and each corresponding to an element of a dynamic situation display.

16. The method of claim 15 further comprising the step of:
accepting at the Plug-In object a second UID event from the first window representing one from the following group:
user commands to Play, Stop, Show and Hide the slide display.

17. The method of claim 16 further comprising the step of:
revising the attributes of at least one of the graphical display object in response to the UID event.

18. The method of claim 15 further comprising the step of:
revising the attributes of at least one of the graphical display objects in response to dynamic situation data arriving from outside the system.

19. The method of claim 11 wherein:
the first window is an element of a commercial version of Microsoft PowerPoint.

20. The method of claim 11 further comprising the step of:
accepting a second UID event from the first window at the Plug-In object representing one from the following group:
user commands to Play, Stop, Show and Hide the slide display.

21. A computer-program product for use in a computer system including a user interface device (UID) for accepting user commands and commercial-off-the-shelf (COTS) software for presenting a slide display on a computer-controlled display device in a first window having means for producing UID events responsive to user commands, the computer program product comprising:
a recording medium;
means recorded on the recording medium for directing the computer system to instantiate a Slide object encapsulating the slide display in a second window;
means recorded on the recording medium for directing the computer system to instantiate a Plug-In object associated with the first window and the Slide object;
means recorded on the recording medium for directing the computer system to instantiate a Component Object Model (COM) Server object associated with the Plug-In object and the Slide object;
means recorded on the recording medium for directing the computer system to instantiate a Dynamic Display object associated with the Slide object;
means recorded on the recording medium for directing computer system to accept a UID event at the Plug-In object; and
means recorded on the recording medium for directing the computer system to call Dynamic Display object methods to revise the slide display in response to the UID event.

22. The computer program product of claim 21 further comprising:
means recorded on the recording medium for directing the computer system to superimpose the contents of the second window over the first window during the slide display presentation.

23. The computer program product of claim 22 wherein:
the first window is an element of COTS slide-show presentation software.

24. The computer program product of claim 23 wherein:
the COTS slide-show presentation software includes a commercial version of Microsoft PowerPoint.

25. The computer program product of claim 21 further comprising:
means recorded on the recording medium for directing the computer system to instantiate a plurality of graphical display objects associated with the Slide object, each graphical display object having attributes and each corresponding to an element of a dynamic situation display.

26. The computer program product of claim 25 further comprising:
means recorded on the recording medium for directing the computer system to accept at the Plug-In object a second UID event from the first window representing one from the following group: user commands to Play, Stop, Show and Hide the slide display.

27. The computer program product of claim 26 further comprising:
means recorded on the recording medium for directing the computer system to revise the attributes of at least one of the graphical display objects in response to the UID event.

28. The computer program product of claim 25 further comprising:
means recorded on the recording medium for directing the computer system to revise the attributes of at least one of the graphical display objects in response to dynamic situation data arriving from outside the system.

29. The computer program product of claim 21 wherein:
the first window is an element of a commercial version of Microsoft PowerPoint.

30. The computer program product of claim 21 further comprising:
means recorded on the recording medium for directing the computer system to accept a second UID event from the first window at the Plug-In object representing one from the following group:
user commands to Play, Stop, Show and Hide the slide display.

31. A computer-program product for use in a computer system including a user interface device (UID) for accepting user commands and commercial-off-the-shelf (COTS) software for presenting a slide display on a computer-controlled display device in a first window having means for producing UID events responsive to user commands, the computer program product comprising:
a recording medium;
means recorded on the recording medium for directing the computer system to instantiate a Slide object encapsulating the slide display in a second window;
means recorded on the recording medium for directing the computer system to instantiate an Plug-In object associated with the first window and the Slide object;
means recorded on the recording medium for directing the computer system to instantiate a Component Object Model (COM) Server object associated with the Plug-In object and the Slide object;
means recorded on the recording medium for directing the computer system to instantiate a Dynamic Display object associated with the Slide object;
means recorded on the recording medium for directing computer system to accept a UID event at the Plug-In object;
means recorded on the recording medium far directing the computer system to call Dynamic Display object methods to revise the slide display in response to the UID event; and
means recorded on the recording medium for directing the computer system to accept a second UID event from the first window at the Plug-In object representing one from the following group:
user commands to Play, Stop, Show and Hide the slide display.

32. In a computer system having a user interface device (UID) for accepting user commands and commercial-off-the-shelf (COTS) software for presenting a slide display on a computer-controlled display device in a first window with means for producing UID events responsive to user commands, a machine-implemented method for presenting the slide display comprising the steps of:
instantiating a Slide object encapsulating the slide display in a second window;
instantiating an Plug-In object associated with the first window and the Slide object;
instantiating a Component Object Model (COM) Server object associated with the Plug-In object and the Slide object;
instantiating a Dynamic Display object associated with the Slide object, the Dynamic Display object having methods for revising the slide display;
accepting a UID event at the Plug-In object;
calling a method on the Dynamic Display object to revise the slide display in response to the UID event; and
accepting a second UID event from the first window at the Plug-In object representing one from the following group:
user commands to Play, Stop, Show and Hide the slide display.

* * * * *